United States Patent
DeSalvo et al.

(10) Patent No.: US 10,082,717 B1
(45) Date of Patent: Sep. 25, 2018

(54) ELECTRO-OPTIC COMMUNICATIONS DEVICE WITH FREQUENCY CONVERSION AND MULTI-MODE OPTICAL FIBER AND RELATED METHODS

(71) Applicant: HARRIS CORPORATION, Melbourne, FL (US)

(72) Inventors: John R. DeSalvo, Cocoa Beach, FL (US); Catheryn D. Logan, Melbourne, FL (US); Charles F. Middleton, Rockledge, FL (US); Elliott J. Grafer, Melbourne Beach, FL (US)

(73) Assignee: HARRIS CORPORATION, Melbourne, FL (US)

( * ) Notice: Subject to any disclaimer, the term of this patent is extended or adjusted under 35 U.S.C. 154(b) by 0 days.

(21) Appl. No.: 15/454,067

(22) Filed: Mar. 9, 2017

(51) Int. Cl.
| | |
|---|---|
| *G02F 1/21* | (2006.01) |
| *H04B 10/80* | (2013.01) |
| *H04B 10/2537* | (2013.01) |
| *H04B 10/2581* | (2013.01) |
| *H04J 14/04* | (2006.01) |
| *H04B 10/2519* | (2013.01) |
| *G02B 6/028* | (2006.01) |
| *G02B 6/02* | (2006.01) |

(52) U.S. Cl.
CPC .......... *G02F 1/21* (2013.01); *G02B 6/02076* (2013.01); *G02B 6/0288* (2013.01); *H04B 10/2519* (2013.01); *H04B 10/2537* (2013.01); *H04B 10/2581* (2013.01); *H04B 10/80* (2013.01); *H04J 14/04* (2013.01); *G02F 2001/212* (2013.01)

(58) Field of Classification Search
CPC combination set(s) only.
See application file for complete search history.

(56) References Cited

U.S. PATENT DOCUMENTS

| | | |
|---|---|---|
| 5,710,651 A | 1/1998 | Logan, Jr. |
| 7,110,646 B2 | 9/2006 | Eggleton et al. |
| 8,515,285 B2 | 8/2013 | DeSalvo et al. |
| (Continued) | | |

OTHER PUBLICATIONS

Fontaine ,"Geometric requirements for photonic lanterns in space division multiplexing", Nov. 19, 2012 / vol. 20, No. 24 / Optics Express 27123.*

(Continued)

*Primary Examiner* — David Payne
*Assistant Examiner* — Omar S Ismail
(74) *Attorney, Agent, or Firm* — Allen, Dyer, Doppelt + Gilchrist

(57) ABSTRACT

A communications device may include a local device, a remote device, and a multi-mode optical fiber coupled between the local device and the remote device. The local device may include a local spatial optical mux/demux coupled to the multi-mode optical fiber and having first and second local optical outputs and first and second local optical inputs, and a local electro-optic E/O modulator coupled to the second local optical input. The remote device may include a remote spatial optical mux/demux coupled to the multi-mode optical fiber, and a remote E/O modulator configured to generate a modulated signal onto a first remote optical output based upon modulating the first optical carrier signal from a first remote optical input responsive to a radio frequency (RF) electrical input signal.

20 Claims, 3 Drawing Sheets

(56) References Cited

U.S. PATENT DOCUMENTS

| | | | |
|---|---|---|---|
| 8,842,992 B2 | 9/2014 | Middleton et al. | |
| 9,411,100 B2 | 8/2016 | Fontaine et al. | |
| 2003/0058504 A1* | 3/2003 | Cho | H04B 10/2543 398/147 |
| 2003/0128417 A1* | 7/2003 | Kawanishi | G02F 1/0356 359/279 |
| 2005/0094928 A1* | 5/2005 | Ng | G02B 6/12019 385/15 |
| 2007/0122156 A1* | 5/2007 | Wang | H04B 10/25 398/141 |
| 2007/0197258 A1* | 8/2007 | Oda | H04B 10/25758 455/554.2 |
| 2010/0098408 A1* | 4/2010 | Lohl | G04F 10/00 398/16 |
| 2010/0247101 A1* | 9/2010 | Pelusi | G02F 1/2252 398/98 |
| 2013/0236187 A1 | 9/2013 | Middleton et al. | |
| 2014/0185125 A1* | 7/2014 | Kanter | G02F 1/21 359/279 |
| 2017/0026125 A1 | 1/2017 | Middleton et al. | |

OTHER PUBLICATIONS

Leon-Saval et al., "Photonic Lanterns: A Study of Light Propagration in Multimode to Single-Mode Converters," Optics Express, vol. 18, No. 8, Apr. 12, 2010, pp. 8430-8439.

Leon-Saval et al., "Photonic Lantern," Institute of Photonics and Optical Science, School of Physics, University of Sydney, Sydney, Australia, Mar. 11, 2015, 14 pages.

Wen et al., "Experimental Demonstration of Long-Distance Analog Transmission over Few-Mode Fibers," Optical Fiber Conference, 2015, pp. 1-3.

Cahill et al., "Suppression of SBS-Induced RF Phase Noise in an RF-Photonic Link," 44th Annual PTTI Systems and Applications Meeting, Nov. 2012, pp. 151-158.

Yaman et al., "10×112Gb/s PDM-QPSK transmission over 5032 km in few-mode fibers," Optics Express, vol. 18, No. 20, Sep. 2010, pp. 1-8.

Tektronix, "Critical RF Measurements in Cable, Satellite, and Terrestrial DTV Systems," Appl. Note, 2005, pp. 7-9.

Mast Et Al., "Extending frequency and bandwidth through the use of agile, high dynamic range photonic converters", Aerospace Conference, IEEE, Mar. 2012, pp. 1-5.

Paresys Et Al., "Low cost bidirectional QPSK transmission with optical frequency conversion", International Topical Meeting on Microwave Photonics, IEEE, Oct. 2009, pp. 1-4.

* cited by examiner

ELECTRO-OPTIC COMMUNICATIONS DEVICE WITH FREQUENCY CONVERSION AND MULTI-MODE OPTICAL FIBER AND RELATED METHODS

TECHNICAL FIELD

The present invention relates to the field of communications, and, more particularly, to optical communications devices and related methods.

BACKGROUND

A typical wireless communication system comprises a plurality of wireless communications devices exchanging data with each other. In some wireless communication systems, for example, infrastructure networks, the system may further comprise a wireless base station for managing communications between the wireless communications devices. In other words, each intra-system communication would be exchanged via the wireless base station. In other wireless communication systems, for example, mesh networks and ad hoc wireless networks, the wireless base station may be omitted, i.e. the wireless communications devices may communicate directly with each other.

A typical Extremely High Frequency (EHF), i.e. 30 to 300 GHz, communication system operating at this band may have some drawbacks. For example, transmission of the signals over coaxial cable may incur large attenuation effects. Moreover, in applications where RF devices are used, the size, weight, and power (SWaP) of the components may increase to undesirable levels. Moreover, downstream receiver processing, such as downconverting, and signal addressing may be difficult.

One approach to these drawbacks in EHF communication systems may comprise the use of optical components for processing components. An advantage of such systems is the ability to transmit EHF signals from a remote location without the degradation of the signal incumbent in RF applications.

For example, as disclosed in U.S. Pat. No. 5,710,651 to Logan, Jr., an EHF communication system comprises a remote antenna station, a transmitter/receiver station, and an optical fiber coupling the stations together. These stations comprise photodiodes for converting the transmitted optical signal to an electrical signal, and lasers paired with optical modulators for converting the received EHF signal to an optical signal.

Nevertheless, optical applications such as this may be subject to certain drawbacks. For example, system performance improves with higher optical power, but the system may be subject to nonlinear optical effects such as stimulated Brillouin scattering that limit the amount of optical power that can be utilized in the system.

SUMMARY

In view of the foregoing background, it is therefore an object of the present disclosure to provide a communications device that is efficient and robust.

This and other objects, features, and advantages in accordance with the present disclosure are provided by a communications device comprising a local device, a remote device, and a multi-mode optical fiber coupled between the local device and the remote device. The local device may include a local spatial optical multiplexer/demultiplexer (mux/demux) coupled to the multi-mode optical fiber and having first and second local optical outputs and first and second local optical inputs, and an optical source configured to generate first and second optical carrier signals coupled to the first and second local optical outputs, respectively. The local device may include an opto-electric (O/E) converter coupled to the first and second local optical inputs, and a local electro-optic (E/O) modulator coupled to the second local optical input. The remote device may include a remote spatial optical mux/demux coupled to the multi-mode optical fiber and having first and second remote optical outputs coupled to the first and second local optical inputs, respectively, and first and second remote optical inputs coupled to the first and second local optical outputs, respectively. The remote device may include a remote E/O modulator configured to generate a modulated signal onto the first remote optical output based upon modulating the first optical carrier signal from the first remote optical input responsive to a radio frequency (RF) electrical input signal. The second remote optical input may be coupled to the second remote optical output. Advantageously, the communications device may operate using a single multi-mode fiber.

More specifically, the local E/O modulator may be configured to modulate the second optical carrier signal from the second local optical input with a reference signal, and the local device may comprise a local oscillator configured to generate the reference signal. The RF electrical input signal may be at a first frequency, and the O/E converter may be configured to generate an output signal comprising a replica of the RF electrical input signal at a second frequency based upon the reference signal, the second frequency being different than the first frequency.

In some embodiments, the local device may comprise a first band pass filter coupled downstream from the local E/O modulator and configured to pass a reference signal frequency sideband, and a second band pass filter coupled downstream from the remote E/O modulator and configured to pass a carrier frequency sideband. The first and second band pass filters may each comprise a fiber Bragg grating.

The O/E converter may comprise first and second optical detectors coupled to the first and second local optical inputs, respectively, and a combiner coupled to the first and second optical detectors. The remote device may include an antenna coupled to the remote E/O modulator. For example, each of the local and remote E/O modulators may include a Mach-Zehnder modulator. The local and remote spatial optical mux/demux's may each comprise a photonic lantern.

Another aspect is directed to a method for communicating. The method may include operating a local device, a remote device, and a multi-mode optical fiber coupled between the local device and the remote device. The local device may include a local spatial optical mux/demux coupled to the multi-mode optical fiber and having first and second local optical outputs and first and second local optical inputs, and an optical source configured to generate first and second optical carrier signals coupled to the first and second local optical outputs, respectively. The local device may include an O/E converter coupled to the first and second local optical inputs, and a local E/O modulator coupled to the second local optical input. The remote device may include a remote spatial optical mux/demux coupled to the multi-mode optical fiber and having first and second remote optical outputs coupled to the first and second local optical inputs, respectively, and first and second remote optical inputs coupled to the first and second local optical outputs, respectively. The remote device may include a remote E/O modulator configured to generate a modulated signal onto the first remote optical output based upon modulating the first optical carrier signal from the first remote optical input responsive to an RF electrical input signal. The second remote optical input may be coupled to the second remote optical output.

DETAILED DESCRIPTION

Figure 1:
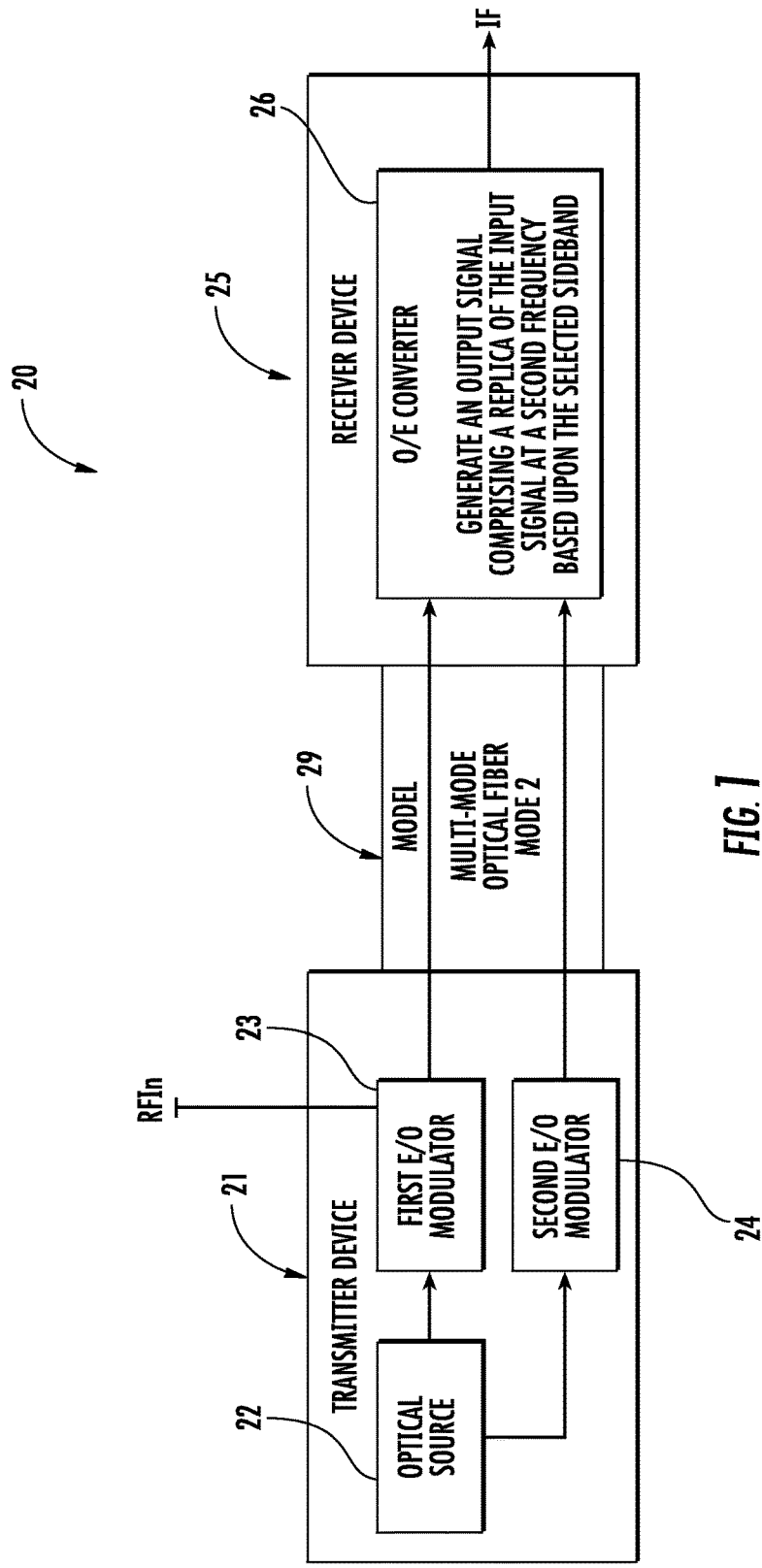
FIG. 1 is a schematic diagram of a communications device, according to the present invention.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Referring initially to FIG. 1, a communications device 20 according to the present invention is now described. The communications device 20 includes a transmitter device 21 comprising an optical source 22 (e.g. laser, LED) generating an optical carrier signal, a first E/O modulator 23 coupled to the optical source and modulating the optical carrier signal with an input signal having a first frequency, and a second E/O modulator 24 coupled to the optical source and modulating the optical carrier signal with a reference signal. For example, the input signal may comprise a millimeter wave signal or a microwave signal.

The communications device includes an optical waveguide 29 coupled to the transmitter device 21, and a receiver device 25 coupled to the optical waveguide and comprising an O/E converter 26 coupled to the optical waveguide and generating an output signal comprising a replica of the input signal at a second frequency based upon the reference signal. The first frequency may be less than the second frequency, or the first frequency may be greater than the second frequency. In other words, the replica of the input signal may be upconverted or downconverted in frequency.

The optical waveguide 29 illustratively includes a multi-mode optical fiber. In other words, the optical signal may comprise multiple modes, i.e. being carried by the multi-mode optical fiber. Although traditional multi-mode fibers do not provide greater bandwidth than single-mode fibers, as they are limited by modal dispersion, they are used because of mode path redundancy, and therefore tolerance to connector and interface imperfections. In this embodiment, individual modes of the multi-mode optical signal are manipulated, i.e. a few mode optical signal. In these few mode embodiments, there is an approach to the dispersion limit issue of multi-mode applications, as each mode is multiplexed as a separate data stream. The primary advantage provided by few mode signal transmission is overall signal bandwidth of the fiber, as each mode acts as an independent signal carrying path in parallel with the other mode paths. For example, the multiple modes of the optical signal carried on the multi-mode optical fiber are separated out for processing (e.g. using a photonic lantern, mode filters, not shown here). In these applications, the optical signal is typically split into multiple paths, each path comprising a mode filter for passing a respective mode. This application may be helpful in mitigating bandwidth bottleneck issues, by breaking the high bandwidth signal apart.

In other embodiments (not shown here), the optical waveguide 29 may comprise a pair of polarization maintaining optical fibers. In the alternative, a pair of polarization stabilization blocks could be placed downstream from the first and second E/O modulators 23-24.

Figure 2:
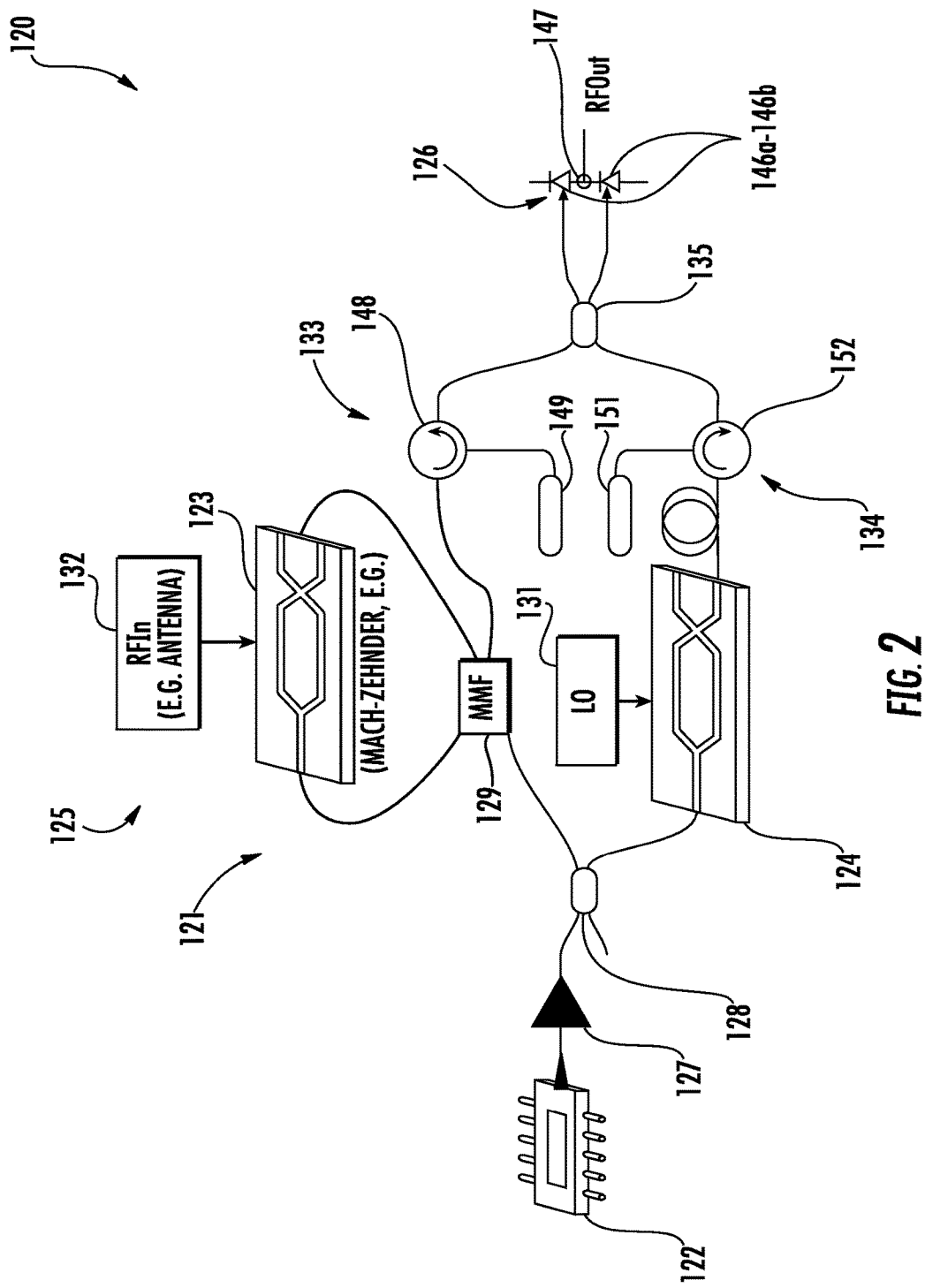
FIG. 2 is a detailed schematic diagram of a communications device, according to the present invention.

Referring now additionally to FIG. 2, another embodiment of the communications device 120 is now described. In this embodiment of the communications device 120, those elements already discussed above with respect to FIG. 1 are given numeral notation incremented by 100 and some require no further discussion herein. The skilled person will appreciate that many of the above features may be incorporated into the embodiment discussed herein.

The transmitter device 121 includes a first band pass filter 133 coupled downstream from the first E/O modulator 123 and passing (i.e. selecting and rejecting everything else) a carrier frequency sideband, and a second band pass filter 134 coupled downstream from the second E/O modulator 124 and passing a reference signal frequency sideband. The first and second band pass filters 133-134 each comprises a fiber Bragg grating 149, 151 and an associated circulator 148, 152.

In this embodiment, the O/E converter 126 comprises first and second optical detectors 146a-146b coupled to the directional coupler 135, and a combiner 147 coupled to the first and second optical detectors. The transmitter device comprises an amplifier 127 coupled between the optical source 122 and the first and second E/O modulators 123-124.

Additionally, the transmitter device 121 further comprises an optical splitter 128 (shown as a directional coupler) coupled between the optical source 122 and the first and second E/O modulators 123-124, and an RF input block 132, such as antenna, coupled to the first E/O modulator. For example, each of the first and second E/O modulators 123-124 may comprise a Mach-Zehnder modulator. The transmitter device 121 also includes a local oscillator (LO) 131 for generating the reference signal, and a directional coupler 135 coupled between said first and second band pass filters 133-134 and the O/E converter 126. The LO 131 is selectively adjusted to control the frequency conversion of the output signal. Advantageously, in embodiments where the optical source 122 comprises a tunable laser, the band pass filters 133-134 can operate at a fixed IF, and frequency conversion can be tuned across a wide spectrum (limited only by the first and second E/O modulators 123-124 bandwidth, which may be over 100 GHz).

In this embodiment, the receiver device 125 only includes the first E/O modulator 123, and the RF input block 132. In others words, the illustrated embodiment relates to RF antenna remoting of received signals. The transmitter device 121 includes the remaining components (the active power components), and is coupled to the receiver device 125 via a long distance optical waveguide 129.

Correlation between the optical source signal paths may need to be maintained by using equal paths for the LO 131 and the RF input signal. The following formula summarizes this relation:

$$S_{\Delta\phi}(f) = 4\sin^2(\pi f \tau_d)\frac{S_{f,l}(f)}{f^2}$$

Indeed, differential path length variations can affect beat note phase stability, and the impact is evaluated, and can be managed in various ways.

Also, the length of the optical waveguide 129 may be several kilometers long, thereby being readily used in remoting applications. In remoting embodiments, the directional coupler 135 may comprise a 2×1 coupler (rather than the illustrated 2×2 coupler) since maintaining matching optical fiber lengths may be problematic. Of course, in these embodiments, the O/E converter 126 would comprise a single ended photodetector rather than the illustrated balanced photodiodes.

Another aspect is directed to a communications method comprising generating an optical carrier signal in a transmitter device 21, 121, and E/O modulating the optical carrier signal with an input signal having a first frequency in the transmitter device. The method also includes E/O modulating the optical carrier signal with a reference signal in the transmitter device 21, 121, and generating an electrical output signal comprising a replica of the input signal at a second frequency based upon the reference signal at the transmitter device 21, 121 via an optical waveguide 29, 129 coupled to the receiver device 25, 125.

Photonic Frequency Conversion

Light from a continuous wave (CW) laser source 122 is amplified and split into two paths. On the upper path, the light propagates over a few-mode fiber 129 and is modulated by the RF or mm-wave signal using an E/O intensity modulator 123, which creates RF sidebands on an optical carrier by modulating the phase of the optical carrier with the input RF voltage using the E/O properties of the modulator material, and then converts the phase shift to an intensity modulation by combining the phase-modulated path interferometrically with an non-modulated path. One of the modulated sidebands is filtered using an optical band pass filter 133, which is realized by combining a fiber Bragg grating and circulator. A fiber Bragg grating is a section of optical fiber in which a periodic change in refractive index has been created. This sets up a diffraction grating through which a narrow range of wavelengths are reflected. The optical circulator passes the reflected portion of the spectrum back into the link.

On the lower path, the light is modulated by the local oscillator signal desired for frequency conversion, again using an E/O modulator 124. One of the LO sidebands is filtered using a fiber Bragg grating and circulator 134. The sidebands from the upper and lower paths are combined in a 2×2 optical coupler 135 and sent to a pair of balanced photodetectors 146a-146b. Thus, the LO sideband becomes the phase reference for the signal sideband, and the frequency spacing of these two sidebands determines the frequency of the signal at the detector output. The balanced photodetectors 146a-146b detect the upper and lower signals coming out of the 2×2 optical coupler 135 and subtract them at a coupling (combiner 147) therebetween. Since the signals are out of phase by 180°, the subtraction at the detector results in the addition of the two signals, while any common-mode noise terms are subtracted.

The E/O modulators 123-124 shown in FIG. 2 are Mach-Zehnder intensity modulators, biased at the null point for maximum sideband power. But other types of modulators can be used, including phase modulators. When a phase modulator is used, higher order sidebands can be selected from the lower path in order to achieve higher frequency up- or down-conversion using a lower-frequency RF source as the LO input. For example, an LO input of 10 GHz into a phase modulator produces sidebands at 10 GHz, 20 GHz, 30 GHz, etc., and the 30 GHz upper sideband can be combined with a signal's lower sideband at 5 GHz to produce an up-converted signal at 35 GHz. Or the 30 GHz upper sideband can be combined with a signal's upper sideband at 32 GHz to produce a 2 GHz IF signal.

The performance of the photonic frequency converter may be driven primarily by the optical power input level at the two modulators, the RF power of the LO signal, and the efficiency of the two fiber Bragg grating filters. Due to balanced detection, the noise terms can be divided into two categories: common mode noise terms—which are canceled by the balanced detectors- and non-canceling noise terms. Common mode noise terms include laser relative intensity noise (RIN) from both the signal and LO paths, amplified spontaneous emission (ASE)-ASE beat noise, signal-ASE beat noise, and LO-ASE beat noise. The non-canceling noise terms are thermal noise from matching impedances at the modulator and detector, shot noise from the signal and the LO, beat noise from the signal RIN and the LO RIN, and shot noise from the ASE. Shot noise terms increase linearly with photocurrent, while gain and third order intercept point (OIP3) increase with the square of the photocurrent. This means that optimal performance is achieved when the system is shot noise-limited.

Figure 3:
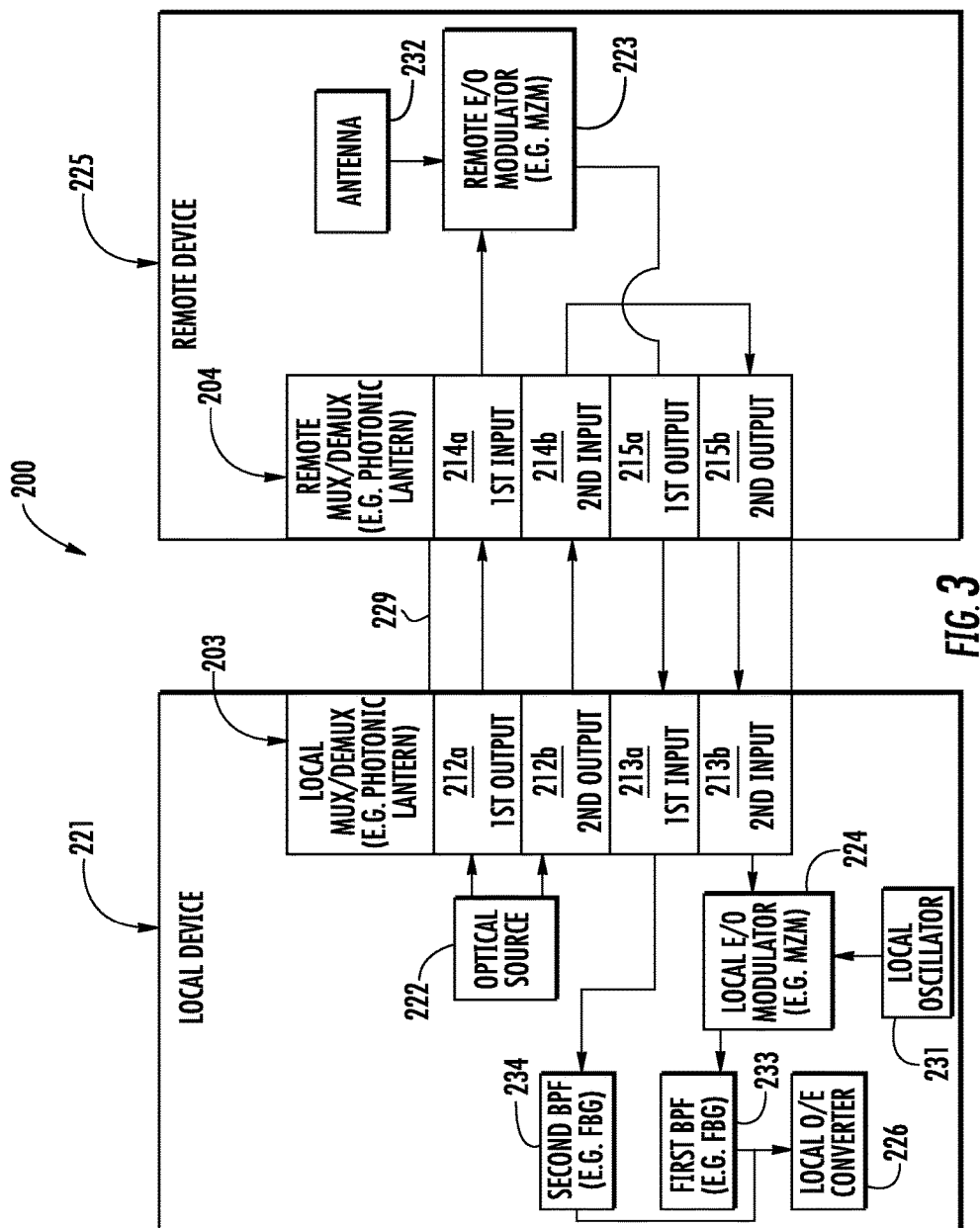
FIG. 3 is a schematic diagram of another embodiment of the communications device, according to the present invention.

Referring now additionally to FIG. 3, another embodiment of the communications device 200 is now described. In this embodiment of the communications device 200, those elements already discussed above with respect to FIGS. 1-2 are given numeral notation incremented by 200 and most require no further discussion herein. The skilled person will appreciate that many of the above features may be incorporated into the embodiment discussed herein.

This embodiment differs from the previous embodiment in that this communications device 200 illustratively includes a local device 221, a remote device 225, and a multi-mode optical fiber 229 coupled between the local device and the remote device. In this embodiment, the remote device 225 and the local device 221 are geographically spaced apart. For example, the remote device 225 may comprise a remote RF antenna, such as a dual channel wideband remote antenna unit (RAU). Also, in this embodiment, the multi-optical fiber optical waveguide (i.e. a fiber optical bundle) of the embodiments of FIGS. 1-2 is replaced by a single multi-mode optical fiber 229. In this illustrated embodiment, the multi-mode optical fiber 229 comprises a 4-mode optical fiber (i.e. the optical fiber is capable of carrying 4 separate modes), but may comprise an optical fiber carrying a greater number of modes, such as an 8-mode optical fiber (i.e. a few mode optical fiber).

Advantageously, this may reduce the diameter of the optical waveguide from the embodiments of FIGS. 1-2, thereby providing greater flexibility in application. Indeed, in applications where the local device 221 provides power to the remote device 225, the communications device 200 comprises a cable conduit (not shown) coupled between the local and remote devices. The cable conduit would comprise the multi-mode optical fiber 229, and a power cable (e.g. a direct current (DC) power cable).

In the embodiments of FIGS. 1-2, the diameter of the cable conduit may be too large for some applications. Helpfully, in the embodiment of FIG. 13, the reduction in diameter of the optical fiber component of the cable conduit may alleviate this issue. Also, the multi-mode optical fiber 229 reduces the connector size at both the local and remote devices 221, 225, which reduces an overall size and weight of each device.

The local device 221 illustratively includes a local spatial optical mux/demux 203 coupled to the multi-mode optical fiber 229 and having first and second local optical outputs 212a-212b and first and second local optical inputs 213a-213b, and an optical source 222 configured to generate first and second optical carrier signals coupled to the first and second local optical outputs, respectively. The local device 221 illustratively includes an O/E converter 226 coupled to the first and second local optical inputs 213a-213b, and a local E/O modulator 224 coupled to the second local optical input 213b.

The remote device 225 illustratively includes a remote spatial optical mux/demux 204 coupled to the multi-mode optical fiber 229. The remote spatial optical mux/demux 204 illustratively includes first and second remote optical outputs 215a-215b coupled to the first and second local optical inputs 213a-213b, respectively, and first and second remote optical inputs 214a-214b coupled to the first and second local optical outputs 212a-212b, respectively.

The remote device 225 illustratively includes a remote E/O modulator 223 configured to generate a modulated signal onto the first remote optical output 215a based upon modulating the first optical carrier signal from the first remote optical input 214a responsive to an RF electrical input signal. The second remote optical input 214b is illustratively coupled to the second remote optical output 215b.

In the illustrated embodiment, the local E/O modulator 224 is configured to modulate the second optical carrier signal from the second local optical input 213b with a reference signal (e.g. local oscillator signal). Here, the local device 221 comprises an LO 231 configured to generate the reference signal.

The RF electrical input signal may be at a first frequency, and the O/E converter 226 is configured to generate an output signal comprising a replica of the RF electrical input signal at a second frequency based upon the reference signal, the second frequency being different than the first frequency. In other words, as in the embodiment of FIGS. 1-2, the communications device 200 may convert the frequency of the RF electrical input signal, for example, downconverting an EHF signal from the remote device 225.

In the illustrated embodiments, the local device 221 illustratively includes a first band pass filter 233 coupled downstream from the local E/O modulator 224 and configured to pass a reference signal frequency sideband, and a second band pass filter 234 coupled downstream from the remote E/O modulator 223 and configured to pass a carrier frequency sideband. For example, the first and second band pass filters 233-234 may each comprise a fiber Bragg grating.

Similar to the embodiments of FIGS. 1-2, the O/E converter 226 may comprise first and second optical detectors coupled to the first and second local optical inputs 213a-213b, respectively, and a combiner coupled to the first and second optical detectors. The remote device 225 illustratively includes an antenna 232 coupled to the remote E/O modulator 223. For example, each of the local and remote E/O modulators 224, 223 may include a Mach-Zehnder modulator.

In some embodiments, the local and remote spatial optical mux/demux's 203-204 may each comprise a long-period grating mode converter (optical or mechanical), such as a photonic lantern. The grating design parameter beat length/mode difference being governed by the following equation:

$$L_B = \frac{2\pi}{(\beta_{01} - \beta_{mn})}.$$

The local and remote spatial optical mux/demux's 203-204 convert from the few-mode optical fiber higher order modes (HOMs) back to the fundamental mode for efficient coupling into the primary optical components that interface with the remote and local devices 225, 221.

Helpfully, these HOMs possess larger effective areas as compared to the fundamental mode in single-mode optical fiber, hence allowing the transport of higher CW optical powers before reaching the stimulated Brillouin scattering (SBS) nonlinear threshold. This may allow the highest, non-damaging operating power on the optical modulator producing the highest signal sideband power ratio.

For example, approaches to a photonic lantern are disclosed in U.S. Pat. No. 9,411,100 to Fontaine et al., the contents of which are hereby incorporated by reference in their entirety, and "Photonic lanterns: a study of light propagation in multimode to single-mode converters", Leon-Saval et al, 12 Apr. 2010/Vol. 18, No. 8/OPTICS EXPRESS 8430, the contents of which are hereby incorporated by reference in their entirety. In yet other embodiments, the local and remote spatial optical mux/demux's 203-204 may each comprise a plurality of different optical paths, and a plurality of mode filters coupled respectively the plurality of different optical paths. One example of an optical filter is disclosed in U.S. Pat. No. 7,110,646 to Eggleton et al., the contents of which are hereby incorporated by reference in their entirety.

Another aspect is directed to a method for communicating. The method may include operating a local device 221, a remote device 225, and a multi-mode optical fiber 229 coupled between the local device and the remote device. The local device 221 may include a local spatial optical mux/demux 203 coupled to the multi-mode optical fiber 229 and having first and second local optical outputs 212a-212b and first and second local optical inputs 213a-213b, and an optical source 222 configured to generate first and second optical carrier signals coupled to the first and second local optical outputs, respectively. The local device 221 may include an O/E converter 226 coupled to the first and second local optical inputs 213a-213b, and a local E/O modulator 224 coupled to the second local optical input 213b. The remote device 225 may include a remote spatial optical mux/demux 204 coupled to the multi-mode optical fiber 229. The remote spatial optical mux/demux 204 may include first and second remote optical outputs 215a-215b coupled to the first and second local optical inputs 213a-213b, respectively, and first and second remote optical inputs 214a-214b coupled to the first and second local optical outputs 212a-212b, respectively. The remote device 225 may include a remote E/O modulator 223 configured to generate a modulated signal onto the first remote optical output 215a based upon modulating the first optical carrier signal from the first remote optical input 214a responsive to an RF electrical input signal. The second remote optical input 214b may be coupled to the second remote optical output 215b.

Another aspect is directed to a method for making a communications device 200. The method may include coupling a local device 221, a remote device 225, and a multi-mode optical fiber 229 between the local device and the remote device. The local device 221 comprises a local spatial optical mux/demux 203 coupled to the multi-mode optical fiber 229 and having first and second local optical outputs 212a-212b and first and second local optical inputs 213a-213b, and an optical source 222 configured to generate first and second optical carrier signals coupled to the first and second local optical outputs, respectively. The local device 221 may include an O/E converter 226 coupled to the first and second local optical inputs 213a-213b, and a local E/O modulator 224 coupled to the second local optical input 213b. The remote device 225 comprises a remote spatial optical mux/demux 204 coupled to the multi-mode optical fiber 229. The remote spatial optical mux/demux 204 may include first and second remote optical outputs 215a-215b coupled to the first and second local optical inputs 213a-213b, respectively, and first and second remote optical inputs 214a-214b coupled to the first and second local optical outputs 212a-212b, respectively. The remote device 225 may include a remote E/O modulator 223 configured to generate a modulated signal onto the first remote optical output 215a based upon modulating the first optical carrier signal from the first remote optical input 214a responsive to an RF electrical input signal. The second remote optical input 214b may be coupled to the second remote optical output 215b.

Other features relating to communications devices are disclosed in U.S. Pat. Nos. 8,842,992 & 8,515,285, also assigned to the present application' assignee, the contents of which are incorporated herein by reference in their entirety.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A communications device comprising:
    a local device, a remote device, and a multi-mode optical fiber coupled between said local device and said remote device;
    said local device comprising
        a local spatial optical multiplexer/demultiplexer (mux/demux) coupled to said multi-mode optical fiber and having first and second local optical outputs and first and second local optical inputs,
        an optical source configured to generate first and second optical carrier signals coupled to the first and second local optical outputs, respectively,
        an opto-electric (O/E) converter coupled to the first local optical input, and
        a local electro-optic (E/O) modulator coupled to the first and second local optical inputs;
    said remote device comprising
        a remote spatial optical mux/demux coupled to said multi-mode optical fiber and having first and second remote optical outputs coupled to said first and second local optical inputs, respectively, and first and second remote optical inputs coupled to said first and second local optical outputs, respectively, and
        a remote E/O modulator configured to generate a modulated signal onto the first remote optical output based upon modulating the first optical carrier signal from the first remote optical input responsive to a radio frequency (RF) electrical input signal,
        said second remote optical input being coupled to said second remote optical output.

2. The communications device of claim 1 wherein said local E/O modulator is configured to modulate the second optical carrier signal from the second local optical input with a reference signal; and wherein said local device comprises a local oscillator configured to generate the reference signal.

3. The communications device of claim 2 wherein the RF electrical input signal is at a first frequency; and wherein said O/E converter is configured to generate an output signal comprising a replica of the RF electrical input signal at a second frequency based upon the reference signal, the second frequency being different than the first frequency.

4. The communications device of claim 1 wherein said local device comprises:
    a first band pass filter coupled downstream from said local E/O modulator and configured to pass a reference signal frequency sideband; and
    a second band pass filter coupled downstream from said remote E/O modulator and configured to pass a carrier frequency sideband.

5. The communications device of claim 4 wherein said first and second band pass filters each comprises a fiber Bragg grating.

6. The communications device of claim 1 wherein said O/E converter comprises:
    first and second optical detectors coupled to the first and second local optical inputs, respectively; and
    a combiner coupled to said first and second optical detectors.

7. The communications device of claim 1 wherein said remote device comprises an antenna coupled to said remote E/O modulator.

8. The communications device of claim 1 wherein each of said local and remote E/O modulators comprises a Mach-Zehnder modulator.

9. The communications device of claim 1 wherein said local and remote spatial optical mux/demux's each comprises a photonic lantern.

10. A communications device comprising:
    a local device, a remote device, and a multi-mode optical fiber coupled between said local device and said remote device;
    said local device comprising
        a local spatial optical multiplexer/demultiplexer (mux/demux) coupled to said multi-mode optical fiber and having first and second local optical outputs and first and second local optical inputs,
        an optical source configured to generate first and second optical carrier signals coupled to the first and second local optical outputs, respectively,
        an opto-electric (O/E) converter comprising first and second optical detectors coupled to the first and second local optical inputs, respectively, and a combiner coupled to said first and second optical detectors,
        a local oscillator configured to generate a reference signal, and
        a local electro-optic (E/O) modulator coupled to the second local optical input and configured to modulate the second optical carrier signal from the second local optical input with the reference signal;
    said remote device comprising
        a remote spatial optical mux/demux coupled to said multi-mode optical fiber and having first and second remote optical outputs coupled to said first and second local optical inputs, respectively, and first and second remote optical inputs coupled to said first and second local optical outputs, respectively, and a remote E/O modulator configured to generate a modulated signal onto the first remote optical output based upon modulating the first optical carrier signal from the first remote optical input responsive to a radio frequency (RF) electrical input signal, said second remote optical input being coupled to said second remote optical output.

11. The communications device of claim 10 wherein the RF electrical input signal is at a first frequency; and wherein said O/E converter is configured to generate an output signal comprising a replica of the RF electrical input signal at a second frequency based upon the reference signal, the second frequency being different than the first frequency.

12. The communications device of claim 10 wherein said local device comprises:

a first band pass filter coupled downstream from said local E/O modulator and configured to pass a reference signal frequency sideband; and a second band pass filter coupled downstream from said remote E/O modulator and configured to pass a carrier frequency sideband.

13. The communications device of claim 12 wherein said first and second band pass filters each comprises a fiber Bragg grating.

14. The communications device of claim 10 wherein said remote device comprises an antenna coupled to said remote E/O modulator.

15. The communications device of claim 10 wherein each of said local and remote E/O modulators comprises a Mach-Zehnder modulator.

16. A method for communicating comprising:

operating a local device, a remote device, and a multi-mode optical fiber coupled between the local device and the remote device;

the local device comprising a local spatial optical multiplexer/demultiplexer (mux/demux) coupled to the multi-mode optical fiber and having first and second local optical outputs and first and second local optical inputs, an optical source configured to generate first and second optical carrier signals coupled to the first and second local optical outputs, respectively, an opto-electric (O/E) converter coupled to the first and second local optical inputs, and a local electro-optic (E/O) modulator coupled to the second local optical input;

the remote device comprising a remote spatial optical mux/demux coupled to the multi-mode optical fiber and having first and second remote optical outputs coupled to the first and second local optical inputs, respectively, and first and second remote optical inputs coupled to the first and second local optical outputs, respectively, and a remote E/O modulator configured to generate a modulated signal onto the first remote optical output based upon modulating the first optical carrier signal from the first remote optical input responsive to a radio frequency (RF) electrical input signal, the second remote optical input being coupled to the second remote optical output.

17. The method of claim 16 wherein the local E/O modulator is configured to modulate the second optical carrier signal from the second local optical input with a reference signal; and wherein the local device comprises a local oscillator configured to generate the reference signal.

18. The method of claim 17 wherein the RF electrical input signal is at a first frequency; and wherein the O/E converter is configured to generate an output signal comprising a replica of the RF electrical input signal at a second frequency based upon the reference signal, the second frequency being different than the first frequency.

19. The method of claim 16 wherein the local device comprises:

a first band pass filter coupled downstream from the local E/O modulator and configured to pass a reference signal frequency sideband; and a second band pass filter coupled downstream from the remote E/O modulator and configured to pass a carrier frequency sideband.

20. The method of claim 19 wherein the first and second band pass filters each comprises a fiber Bragg grating.

* * * * *